US006529975B1

(12) United States Patent
Miller et al.

(10) Patent No.: US 6,529,975 B1
(45) Date of Patent: Mar. 4, 2003

(54) METHOD AND APPARATUS FOR ADDRESSING AND CONTROLLING EXSPANSION DEVICES THROUGH AN AC-LINK AND A CODEC

(75) Inventors: Mark E Miller, Mission Viejo, CA (US); David P Braun, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/432,434

(22) Filed: Nov. 2, 1999

(51) Int. Cl.$^7$ .............. G06F 13/12; G06F 3/00; G06F 13/24
(52) U.S. Cl. .............. 710/64; 710/69; 710/15; 710/266
(58) Field of Search .............. 710/64, 15, 23, 710/46, 266, 4, 8, 69

(56) References Cited

U.S. PATENT DOCUMENTS

| | | | | |
|---|---|---|---|---|
| 5,974,471 A | * | 10/1999 | Belt .............. | 710/1 |
| 6,195,766 B1 | * | 2/2001 | Maxwell et al. .............. | 714/38 |
| 6,263,075 B1 | * | 7/2001 | Fadavi-Ardekani et al. | 379/399 |
| 6,269,103 B1 | * | 7/2001 | Laturell .............. | 370/458 |
| 6,389,033 B1 | * | 5/2002 | Maxwell et al. .............. | 370/438 |
| 6,393,572 B1 | * | 5/2002 | Datta et al. .............. | 713/322 |
| 6,401,152 B1 | * | 6/2002 | Solomon et al. .............. | 710/104 |
| 6,427,011 B1 | * | 7/2002 | Sacca .............. | 379/399.01 |
| 6,434,633 B1 | * | 8/2002 | Braun et al. .............. | 710/15 |

OTHER PUBLICATIONS

"Audio Codec '97", Revision 2.2 Revison 1.0, Apr. 2002, Intel.*

* cited by examiner

*Primary Examiner*—Peter Wong
*Assistant Examiner*—Tim Vo

(57) ABSTRACT

In one embodiment, a single designated register in a codec is utilized by a controller to address and control a large number of expansion registers belonging to various expansion devices. The controller can write to or read from the designated register through an AC-link while complying with the AC '97 specification. The address and data bits in the designated register are used to write to or read from a target register in an expansion device. The designated register is selected from one of the 16 registers available to a design engineer in accordance with the AC '97 specification. An example of an expansion device that can be addressed and controlled through the designated register is an SSD device. In another embodiment, two designated registers in the codec register set are utilized. The controller can write address information into one of the designated registers while complying with the AC '97 specification. The controller can also write data to or read data from the other designated register through the AC-link while complying with the AC '97 specification. The address and data bits in the designated registers are used to write to or read from a target register in an expansion device. The two designated registers are selected from the 16 registers available to a design engineer in accordance with the AC '97 specification.

51 Claims, 14 Drawing Sheets

| Reg | Name | D15 | D14 | D13 | D12 | D11 | D10 | D9 | D8 | D7 | D6 | D5 | D4 | D3 | D2 | D1 | D0 | Default |
|---|---|---|---|---|---|---|---|---|---|---|---|---|---|---|---|---|---|---|
| 00h | Reset | x | SE4 | SE3 | SE2 | SE1 | SE0 | ID9 | ID8 | ID7 | ID6 | ID5 | ID4 | ID3 | ID2 | ID1 | ID0 | na |
| 02h | Master Volume | Mute | x | ML5 | ML4 | ML3 | ML2 | ML1 | ML0 | x | x | MR5 | MR4 | MR3 | MR2 | MR1 | MR0 | 8000h |
| 04h | *Headphone Volume* | *Mute* | x | *ML5* | *ML4* | *ML3* | *ML2* | *ML1* | *ML0* | x | x | *MR5* | *MR4* | *MR3* | *MR2* | *MR1* | *MR0* | *8000h* |
| 06h | Master Volume Mono | Mute | x | x | MM4 | MM3 | MM2 | MM1 | MM0 | x | x | MM5 | x | MM3 | MM2 | MM1 | MM0 | 8000h |
| 08h | Master tone (R & L) | x | x | x | x | BA3 | BA2 | BA1 | BA0 | x | x | x | x | TR3 | TR2 | TR1 | TR0 | 0F0Fh |
| 0Ah | *PC_BEEP Volume* | *Mute* | *PR6* | x | *PR4* | *PR3* | *PR2* | *PR1* | x | x | x | x | *PV3* | *PV2* | *PV1* | *PV0* | x | *x000h* |
| 0Ch | *Phone Volume* | *Mute* | x | x | x | x | x | x | x | x | x | x | *GN4* | *GN3* | *GN2* | *GN1* | *GN0* | *8008h* |
| 0Eh | Mic Volume | Mute | x | x | x | x | x | x | x | x | 20 dB | x | GN4 | GN3 | GN2 | GN1 | GN0 | 8008h |
| 10h | Line In Volume | Mute | x | x | GL4 | GL3 | GL2 | GL1 | GL0 | x | x | x | GR4 | GR3 | GR2 | GR1 | GR0 | 8808h |
| 12h | CD Volume | Mute | x | x | GL4 | GL3 | GL2 | GL1 | GL0 | x | x | x | GR4 | GR3 | GR2 | GR1 | GR0 | 8808h |
| 14h | *Video Volume* | *Mute* | x | x | *GL4* | *GL3* | *GL2* | *GL1* | *GL0* | x | x | x | *GR4* | *GR3* | *GR2* | *GR1* | *GR0* | *8808h* |
| 16h | *Aux Volume* | *Mute* | x | x | *GL4* | *GL3* | *GL2* | *GL1* | *GL0* | x | x | x | *GR4* | *GR3* | *GR2* | *GR1* | *GR0* | *8808h* |
| 18h | PCM Out Vol | Mute | x | x | GL4 | GL3 | GL2 | GL1 | GL0 | x | x | x | x | GR3 | GR2 | GR1 | GR0 | 8808h |
| 1Ah | Record Select | x | x | x | x | x | SL2 | SL1 | SL0 | x | x | x | x | x | SR2 | SR1 | SR0 | 0000h |
| 1Ch | Record Gain | Mute | x | x | x | GL3 | GL2 | GL1 | GL0 | x | x | x | x | GR3 | GR2 | GR1 | GR0 | 8000h |
| 1Eh | *Record Gain Mic* | *Mute* | x | x | x | x | x | x | *GL0* | x | x | x | x | x | x | *GM1* | *GM0* | *8000h* |
| 20h | General Purpose | POP | ST | 3D | LD | x | x | MIX | MS | LPBK | x | x | x | x | x | x | x | 0000h |
| 22h | 3D Control | x | PR6 | x | x | CR3 | CR2 | CR1 | CR0 | x | x | x | x | DP3 | DP2 | DP1 | DP0 | 0000h |
| 24h | *Reserved* | x | x | x | x | x | x | x | x | x | x | x | x | *DP3* | *DP2* | *DP1* | *DP0* | *0000h* |
| 26h | Powerdown Ctrl/Stat | EAPD | x | PR5 | PR4 | PR3 | PR2 | PR1 | PR0 | x | x | x | x | REF | ANL | DAC | ADC | x |
| 28h–3Ah | *Audio* | A | A | A | A | A | A | A | A | A | A | A | A | A | A | A | A | na |
| 3Ch–58h | Modem | B | B | B | B | B | B | B | B | B | B | B | B | B | B | B | B | A |
| 5Ah–7Ah | *Vendor Reserved* | x | x | x | x | x | x | x | x | x | x | x | x | x | x | x | x | B |
| 7Ch | Vendor ID1 | F7 | F6 | F5 | F4 | F3 | F2 | F1 | F0 | S7 | S6 | S5 | S4 | S3 | S2 | S1 | S0 | na |
| 7Eh | Vendor ID2 | T7 | T6 | T5 | T4 | T3 | T2 | T1 | T0 | REV7 | REV6 | REV5 | REV4 | REV3 | REV2 | REV1 | REV0 | na |

FIG. 6

METHOD AND APPARATUS FOR ADDRESSING AND CONTROLLING EXSPANSION DEVICES THROUGH AN AC-LINK AND A CODEC

BACKGROUND OF THE INVENTION

1. Field of the Invention

The present invention is in the field of computers and signal processing systems and circuits. More particularly, the invention is in the field of addressing a set of devices through a codec.

2. Background Art

Personal computers are used extensively to communicate through a telephone line with a modem. Personal computers are also widely used for receiving or producing audio signals in order to communicate with PC users or for entertainment. To facilitate the handling of audio signals, an audio "codec" is used by in PC's. Also, a modem "codec" is used as part of a typical modem used in PCs. A codec (COder-DECoder) is a circuit that converts analog signals to digital code and vice versa using conversion methods such as PCM (Pulse Code Modulation). A codec typically includes both analog to digital and digital to analog conversion circuits.

FIG. 1 is a prior art diagram illustrating how a codec might be connected to a motherboard and in particular to a controller. Motherboard 110 is a modem PC motherboard. System logic 112 resides on motherboard 110 and is coupled to the remaining components on the motherboard primarily through a PCI (Peripheral Component Interconnect) bus 114. Controller 116 communicates with system logic 112 through PCI bus 114. In FIG. 1, controller 116 is shown as a stand-alone device. However, controller 116 could be embedded or incorporated into other portions of the PC system including the system logic.

A riser 128 houses other components in FIG. 1. Riser 128 complies with the industry's standard specification for an Audio/Modem Riser (or "AMR"). The AMR specification defines an industry standard form factor for Audio, Audio/Modem or just Modem risers. The AMR specification defines riser mechanical and electrical requirements for certain systems using what is called an AC-link ("Audio Codec link") interface as one of the connections between the riser and the motherboard.

Referring to FIG. 1, riser 128 includes codec 126. When riser 128 is plugged into motherboard 110, codec 126 communicates with controller 116 through AC-link 124, AMR interface connectors 122 and 120, and AC-link 118. Alternatively, the combination of AC-link 124, AMR interface connectors 122 and 120, and AC-link 118 can be thought of simply as a single AC-link connecting controller 116 to codec 126.

Reference is made to FIG. 2 which shows controller 216 that is coupled to codec 226 through AC-link 218. Codec 226 includes codec register set 230. Codec register set 230 is utilized by system and circuit design engineers for various control functions such as for configuring the codec or for setting up the codec to record a certain input such as a CD ROM input. As further examples, the registers in codec register set 230 are used for setting headphone volume, PC beep volume, microphone volume, CD volume, video volume, record gain, 3D control, audio status, audio sample rate control, modem status, modem DAC/ADC level control, GPIO (General Purpose Input/Output) pin configuration, GPIO pin polarity and type, power management, as well as many other codec functions.

Typical codecs, such as those complying with the Intel® AC '97 specification entitled "AC '97 Component Specification," Revision 2.1, published by Intel® Corporation on May 22, 1998 (or simply "AC '97 specification"), have been designed to perform primarily audio related functions. However, it has become increasingly important for codecs, such as those complying with AC '97 specification, to perform primarily modem related functions. Modem related functions can require additional modules to be controlled by the controller. An example of when an additional module or device and a respective set of registers need to be addressed and controlled through the AC-link is when it is desired to perform a DSP ("Digital Signal Processing") function, such as acoustic echo cancellation, at a point beyond the AC-link and the codec (as opposed to performing the echo cancellation in the controller itself).

Other examples of additional modules or devices and their respective set of registers that need to be addressed and controlled through the AC-link are an LSD ("Line Side Device"), an SSD ("System Side Device"), and an E-PHY ("Ethernet PHYsical-layer interface") device. By way of background, an LSD is a module that has been recently devised and added by some manufacturers to a Data Access Arrangement ("DAA") device in order to facilitate the interfacing of the DAA with a codec. A DAA is a device that is widely used in the art and is conventionally comprised of discrete components used to interface with a telephone line. As stated above, recently, the LSD has been added as a module in the DAA to facilitate interfacing between the DAA and a codec. With the recent addition of the LSD to the DAA by some manufacturers, the DAA is comprised of two main modules which are (a) the discrete component module, and (b) the LSD.

The addition of the LSD to the DAA has resulted in the addition of a module inside the codec to interface with the LSD. The module inside the codec is the SSD. The interface between the LSD which is outside the codec and the SSD which is inside the codec is performed through what is referred to as a Digital Isolation Barrier ("DIB"). The addition of the LSD and the SSD as recent modules that facilitate codec operations and which facilitate the codec interfacing with a telephone line, has given rise to the need to address and control these recently added modules, namely the LSD and the SSD, through the AC-link and the codec. It is noted that an SSD may also be a device separate from (as opposed to integrated in) the codec. An E-PHY is a device that performs Ethernet related functions in a LAN ("Local Area Network"). The E-PHY may be integrated in the codec or, alternatively, the E-PHY may be a device separate from the codec. Each of these modules or devices, i.e. the SSD, LSD, and E-PHY, has a respective set of registers which needs to be addressed and controlled by the controller through the AC-link.

As stated above, in each of the above examples the controller is required to address and control a bank of registers that are accessible to the controller only through the AC-link and the codec. In other words, in order to access devices that are located "beyond" the AC-link, the controller must go through both the AC-link and the codec. As such, the controller must comply with the limitations of the AC-link as well as the limitations of the codec itself. The limitations of the AC-link stem from (a) the limited number of physical wires (or lines) available in the AC-link for communication between the controller and the codec; and (b) a predetermined protocol for AC-link to conduct communications between the controller and the codec. The limitations of the codec stem primarily from the limited number of registers which can by used by a design engineer according to the AC '97 specification for a codec.

The combined limitations of the AC-link and the codec, i.e. the limited number of lines in the AC-link, the predetermined protocol of the AC-link, and the small number of available registers in the codec, make it very difficult, if not impossible, for the design engineer to address and control expansion modules or devices, such as SSD, LSD, and E-PHY, that need to be addressed and controlled by going through the AC-link and the codec.

As regards the small number of available registers in the codec, the AC '97 specification, which is widely used in the industry, is directed to a codec having merely a total of 128 registers, each register being 16-bit wide. However, according to the AC '97 specification, the design engineer is not permitted to address any of the odd-numbered registers in the codec. In fact, according to the AC '97 specification, the codec responds with all 0's to accesses of the odd-numbered registers. Thus, the total number of registers in an AC '97 codec is effectively 64, i.e. the 64 even-numbered registers from the total of 128 registers. However, most of these 64 even-numbered registers are reserved for predetermined functions such as headphone volume, PC beep volume, microphone volume, CD volume, line in volume, video volume, record select, record gain, 3D control, audio status, audio sample rate control, modem status, modem DAC/ADC level control, GPIO (General Purpose Input/Output) pin configuration, GPIO pin polarity and type, power down control and status, as well as many other codec functions.

In fact, only 16 even-numbered registers in the AC '97 specification are available for arbitrary use by a design engineer. These 16 even-numbered registers available for arbitrary use are referred to as vendor specific registers. More specifically, only the even-numbered registers between addresses 5A (hexadecimal) and 7A (hexadecimal) are available for use by a design engineer. What makes matters worse is that a large number of design engineers and "vendors" compete for the use of these 16 registers to accomplish their own design objectives. In other words, each design engineer or vendor has his or her own different customized code and his or her own different requirements for addressing and controlling the 16 available registers, i.e. the registers having addresses 5A (hexadecimal) to 7A (hexadecimal). In sum, there simply are not nearly enough registers for control of expansion modules and devices such as SSD, LSD, and E-PHY.

With respect to the limited number of physical wires (or lines) available in the AC-link for communication between the controller and the codec, there are merely five lines (i.e. five wires) available in the AC-link for connecting the controller to the codec. From these five lines, only one line, i.e. an "SDATA_OUT" line is used for addressing and controlling the codec's 128 registers discussed above. According to the AC '97 specification, only this line, i.e. SDATA_OUT, can be used to address and control a large number of registers belonging to expansion devices such as SSD, LSD, and E-PHY mentioned above. Thus, it is not possible, while complying with the AC '97 specification, to add an extra line for the purpose of communication with the expansion devices and modules such as those mentioned above.

Regarding the AC-link's predetermined protocol for communications between the controller and the codec, the protocol allows merely seven bits for addressing the codec registers. Although these seven bits theoretically address all the 128 registers in the codec, only 16 of these registers at addresses 5A (hexadecimal) to 7A (hexadecimal) are available for use by a number of competing design engineers and vendors.

Therefore, it is apparent that any design engineer wanting or needing to address expansion devices and modules by going through the AC-link and the codec has available to him or her only a very limited number of registers, i.e. 16 even-numbered and wordwide registers between addresses 5A (hexadecimal) and 7A (hexadecimal). This limited number of registers does not permit a one to one mapping of all the registers in expansion devices and modules into these registers. In other words, out of a great number of registers located in the expansion devices and modules such as SSD, LSD, and E-PHY, only a total of 16 registers can be possibly mapped into the 16 available registers between addresses 5A (hexadecimal) and 7A (hexadecimal). Thus, it is clear that a one to one mapping is not a solution.

Accordingly, there is serious need in the art for a solution to the persistent problem of inability of a design engineer to address and control expansion modules and devices by accessing them through an AC-link and a codec. More specifically, there is serious need in the art for a solution to overcome the limitations imposed by the AC '97 specification which are availability of only one line, i.e. the SDATA_OUT line, the availability of only 16 registers, and the restrictions imposed by a predetermined communication protocol. As discussed above, unless these limitations are overcome, it would be practically impossible for the design engineer to access and control expansion modules and devices by going through the AC-link and the codec.

SUMMARY OF THE INVENTION

The present invention is method and apparatus for addressing and controlling expansion devices through an AC-link and a codec. The invention overcomes the serious need in the art for addressing and controlling expansion modules and devices by accessing them through an AC-link and a codec. The invention enables a controller to address and control the large number of registers in various expansion devices despite the limitations imposed by the small number of available registers in the codec register set and despite the limitations imposed by a single line available for transmission of address and control data to the codec, and further despite the limitations due to a restrictive protocol for communications between the codec and the controller.

In one embodiment, the invention utilizes one of the vendor specific registers in the codec register set as a designated register. A controller can write to or read from the designated register through an AC-link while complying with the AC '97 specification. The address and data bits in the designated register are used to write to or read from a target register in an expansion device. The designated register is selected from one of the 16 registers available to a design engineer in accordance with the AC '97 specification. An example of an expansion device that can be addressed and controlled through the designated register is an SSD device. Thus, through the designated register the controller can address and control a large number of expansion registers belonging to various expansion devices.

In another embodiment, the invention utilizes two designated registers in the codec register set. A controller can write address information into one of the designated registers while complying with the AC '97 specification. The controller can also write data to or read data from the other designated register through the AC-link while complying with the AC '97 specification. The address and data bits in the designated registers are used to write to or read from a target register in an expansion device. The two designated registers are selected from the 16 registers available to a design engineer in accordance with the AC '97 specification.

BRIEF DESCRIPTION OF THE DRAWINGS

FIG. 6 is a register map illustrating the usage of the various registers in the codec register set according to the AC '97 specification.

DETAILED DESCRIPTION OF THE INVENTION

The present invention is method and apparatus for addressing and controlling expansion devices through an AC-link and a codec. Although the invention is described with respect to a specific embodiment, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
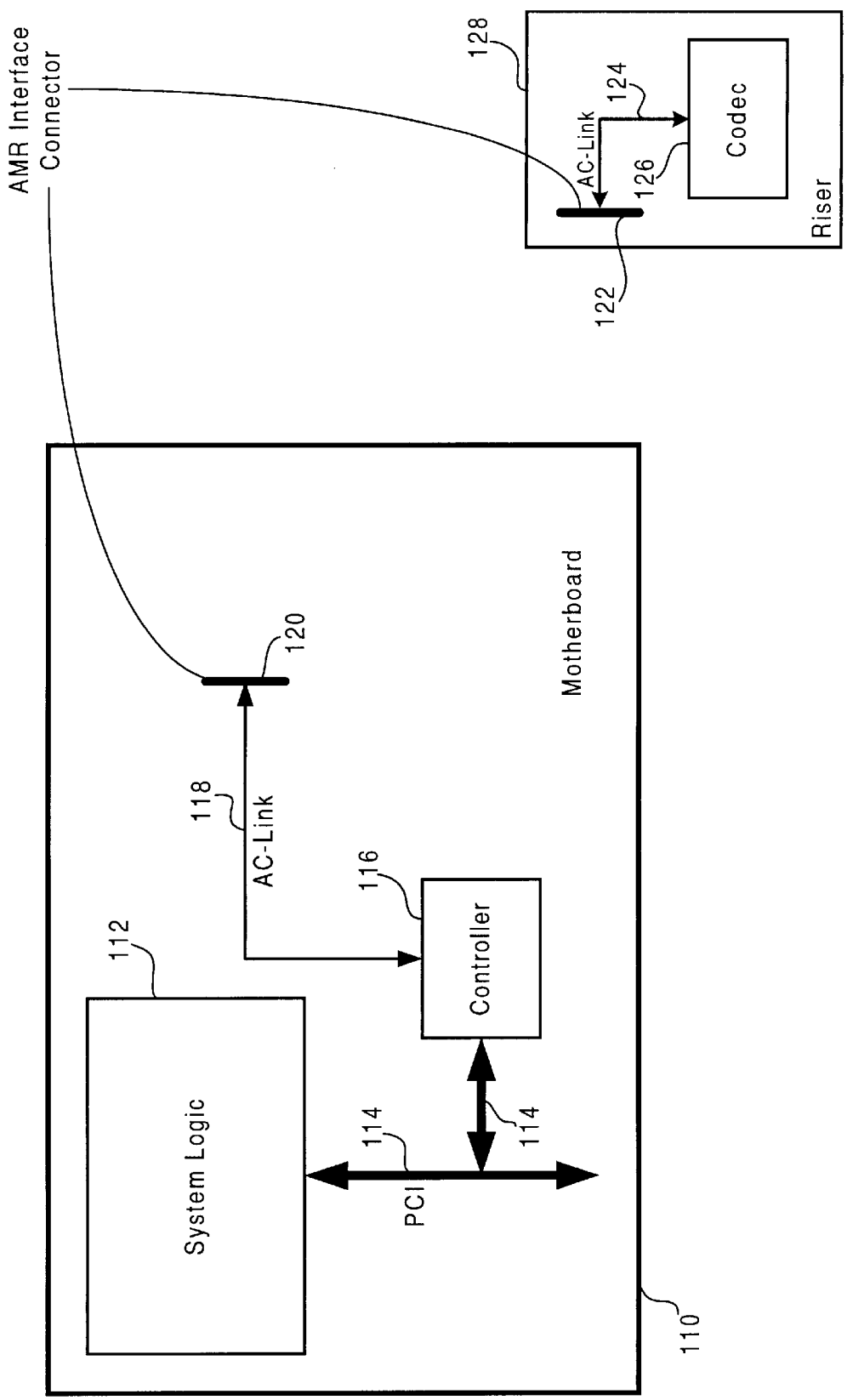
FIG. 1 is a prior art diagram illustrating how a codec is connected to a motherboard and in particular to a controller.
Figure 2:
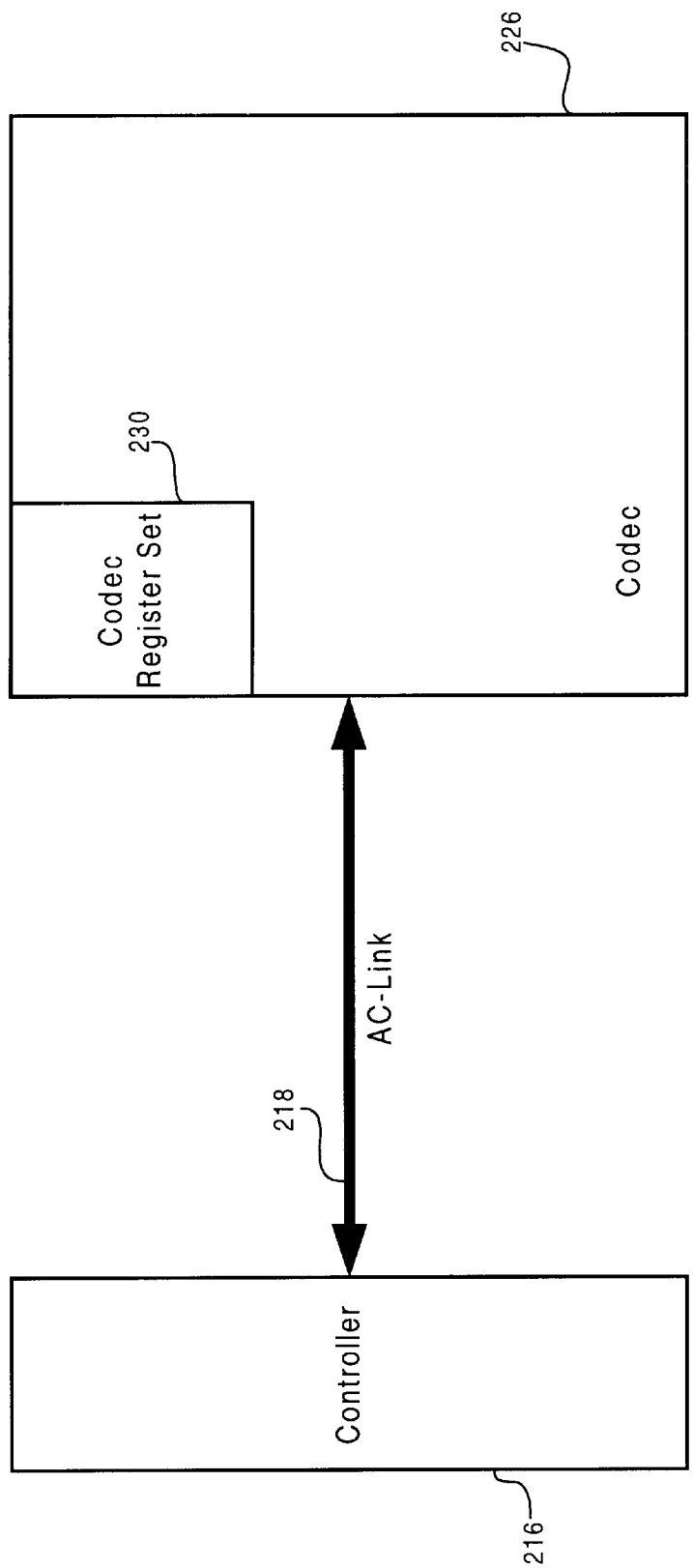
FIG. 2 is a prior art diagram showing a controller coupled to a codec through an AC-link.
Figure 3:
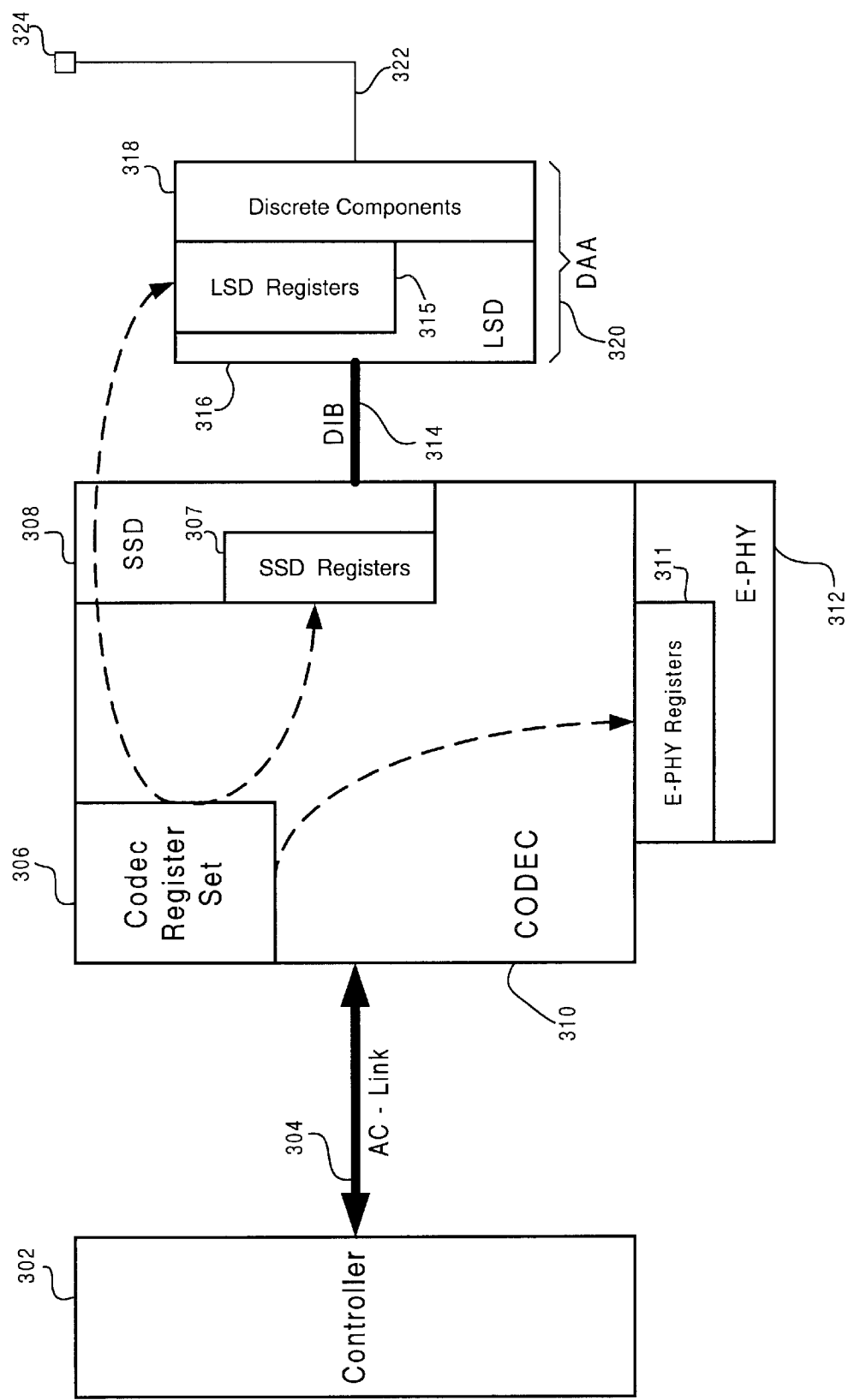
FIG. 3 illustrates a controller addressing a codec and various expansion devices through an AC-link.

With respect to the specific embodiments of the invention described in the present application, reference is made to FIG. 3. As shown in FIG. 3, a controller 302 is coupled to a codec 310 through AC-link 304. SSD 308 is shown as being integrated in codec 310. However, as previously mentioned, SSD 308 could have been a separate device not integrated in codec 310. SSD 308 includes a set of registers referred to as SSD registers 307. E-PHY 312 is also shown as being integrated in codec 310. However, as mentioned above, E-PHY 312 may have been a separate device not integrated in codec 310. E-PHY 312 includes a set of registers referred to as E-PHY registers 311.

Codec 310 is coupled to other devices containing their own sets of registers. For example, codec 310 is coupled to LSD 316 through DIB ("Digital Isolation Barrier") 314. LSD 316 includes a set of registers referred to as LSD registers 315. LSD 316 is part of a DAA ("Data Access Arrangement") device 320. DAA 320 also comprises discrete components module 318. Discrete components module 318 is coupled to an RJ-11 telephone jack 324 via line 322. In the present application, devices such as SSD 308, E-PHY 312, and LSD 316 are also referred to as "expansion devices." Also, in this application, register sets such as SSD registers 307, E-PHY registers 311, and LSD registers 315 are also referred to as "expansion registers."

Although only specific expansion modules and devices such as SSD 308, E-PHY 312, and LSD 316 are discussed in the present application, it is known and appreciated that the principles of the present invention is not limited to those specific expansion modules and devices discussed in the present application. Moreover, as will become apparent from the following description, the invention applies equally to a situation where a greater number of expansion devices (i.e., devices in addition to the SSD, LSD, and E-PHY) are used.

It is noted that the embodiment of the invention described in the present application is directed to a codec that complies with Intel® AC '97 specification. Intel® AC '97 includes a detailed disclosure of an architecture of a codec and a description of a communication protocol used in the AC-link, as well as a detailed description of the various signals, registers, and timing diagrams of the codec and its controller. Such detailed description set forth in Intel® AC '97 specification is not repeated here. However, the entire Intel® AC '97 specification which is entitled "AC '97 Component Specification," Revision 2.1, published on May 22, 1998 by Intel® Corporation is hereby incorporated fully by reference into the present application and is referred to as the "AC '97 specification" in this application. Moreover, whenever in the present application reference is made to an "AC-link", it is understood that the AC-link is one that complies with the AC '97 specification. Further, the communication protocol used in the AC-link and described fully in the AC '97 specification is referred to as the "AC '97 communication protocol."

An example of a controller used as controller 302 is any of the controllers embodied into Intel® chip sets which support the desk top Pentium) based personal computers or the mobile Pentium® based computers as well as other chips made by Intel® which have a controller embedded therein. Also, chip sets made by a number of other manufacturers and some PCI based peripherals made by a few other manufacturers include a controller which can be used as controller 302.

Figure 4:
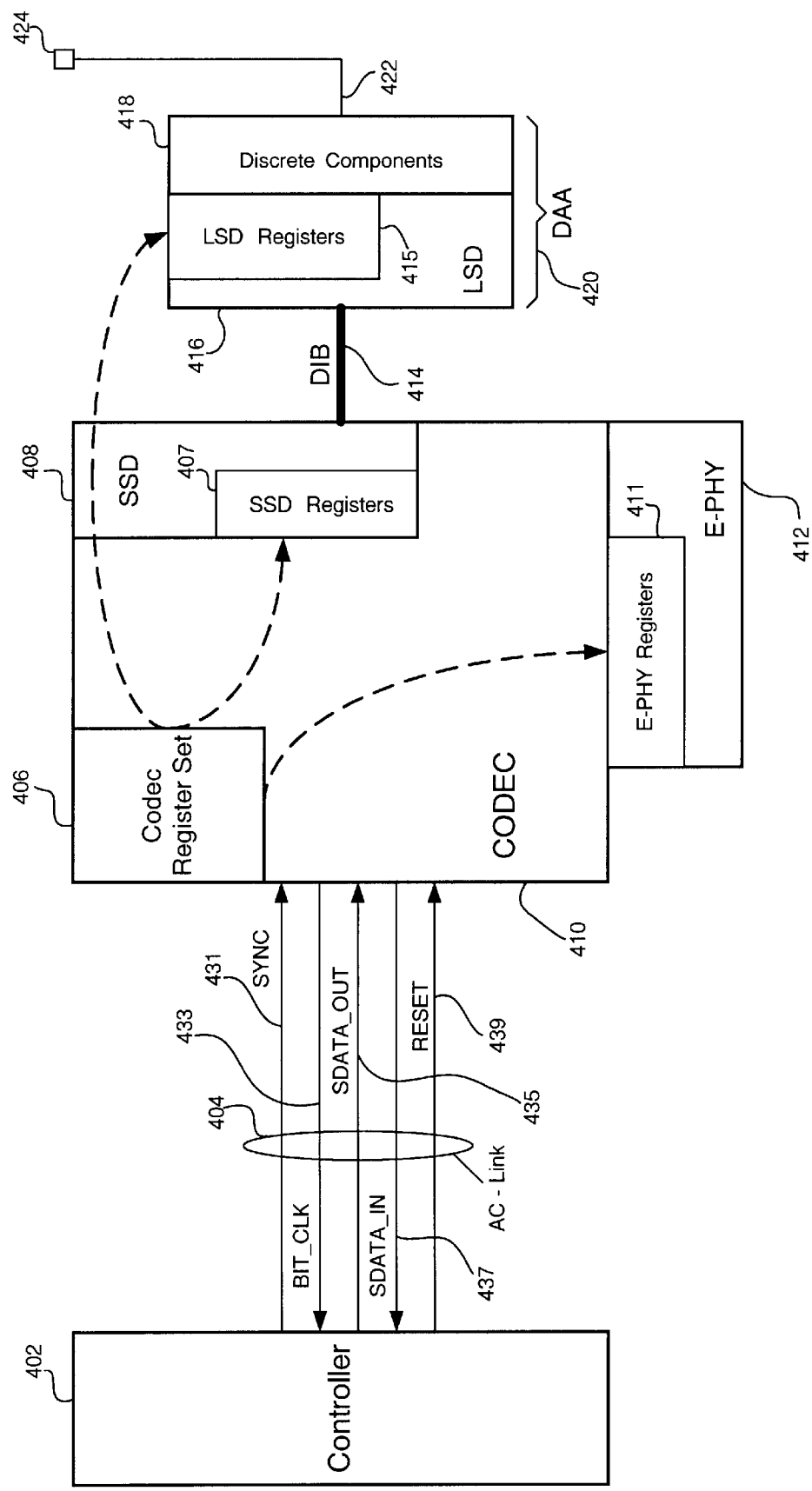
FIG. 4 illustrates a controller addressing a codec and various expansion devices through an AC-link where the various lines comprising the AC-link are shown.

Continuing with the specific embodiment of the invention described in the present application, reference is made to FIG. 4. The actual five wires (or lines) enabling physical communication in AC-link 404 are shown in FIG. 4. These five lines are SYNC 431, BIT_CLK 433, SDATA_OUT 435, SDATA_IN 437, and RESET 439 as shown in FIG. 4. FIG. 4 also shows controller 402 (corresponding to controller 302 in FIG. 3) and codec 410 (corresponding to codec 310 in FIG. 3) that are connected to each other via the five lines SYNC 431, BIT_CLK 433, SDATA_OUT 435, SDATA_IN 437, and RESET 439. As stated previously, codec 410 comprises codec register set 406 (corresponding to codec register set 306 in FIG. 3). SSD 408 (corresponding to SSD 308 in FIG. 3) which includes SSD registers 407 (corresponding to SSD registers 307 in FIG. 3) is integrated into codec 410. E-PHY 412 (corresponding to E-PHY 312 in FIG. 3) which includes E-PHY registers 411 (corresponding to E-PHY registers 311) is also integrated into codec 410.

Codec 410 is also coupled to LSD 416 (corresponding to LSD 316 in FIG. 3) through DIB 414 (corresponding to DIB 314 in FIG. 3). LSD 416 includes LSD registers 415 (corresponding to LSD registers 315 in FIG. 3). As stated above, LSD 416 is part of a DAA device 420 (corresponding to DAA device 320 in FIG. 3). DAA 420 also comprises discrete components module 418 (corresponding to discrete components module 318 in FIG. 3). Discrete components module 418 is coupled to an RJ-11 telephone jack 424 (corresponding to telephone jack 324 in FIG. 3) via line 422 (corresponding to line 322 in FIG. 3).

Figure 5:
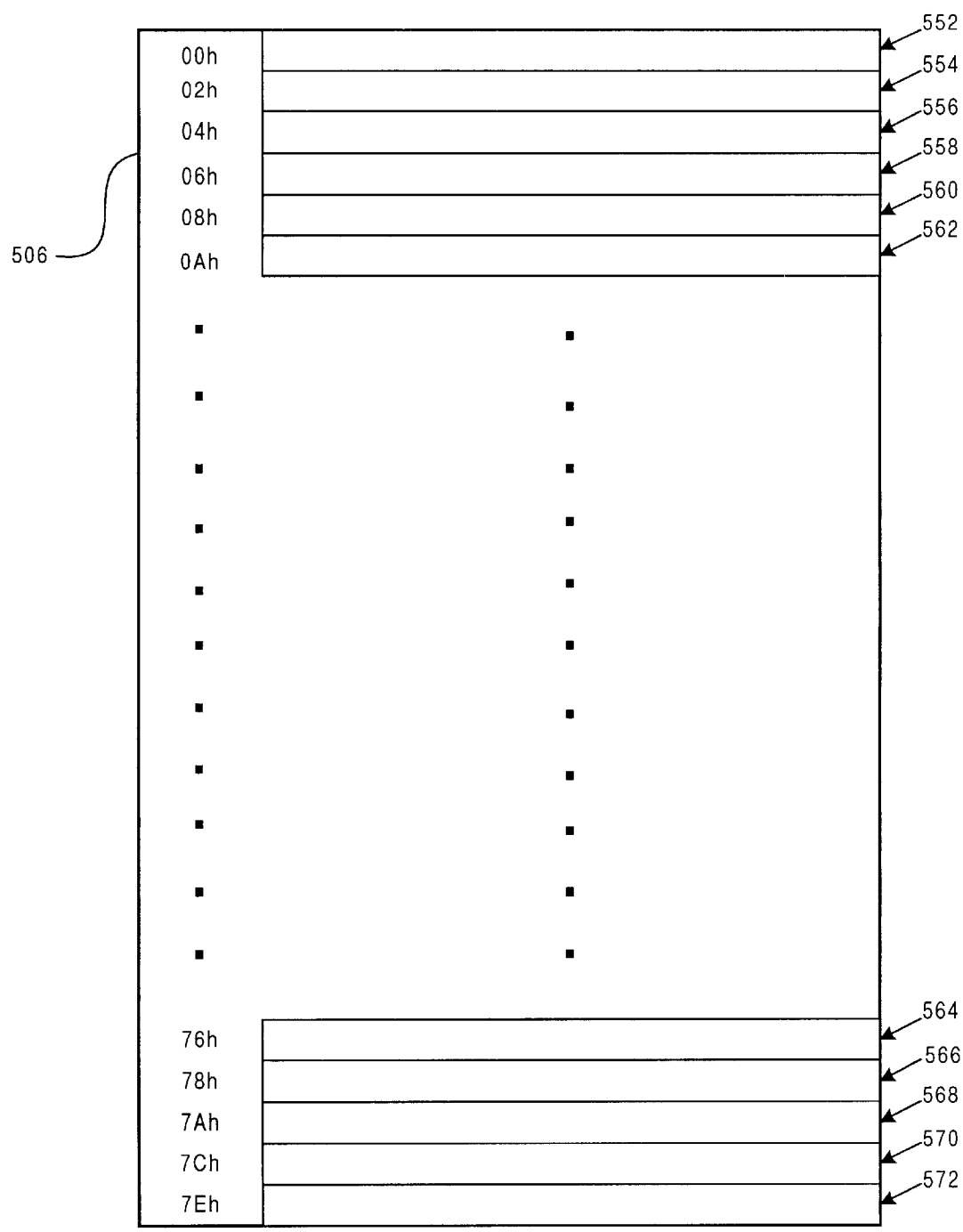
FIG. 5 is an expanded illustration of an AC '97 codec register set.

Referring to FIG. 5, codec register set 506 (corresponding to codec register set 306 in FIG. 3) is shown in expanded form. Codec register set 506 which complies with the AC '97 specification consists of a total of 128 registers at addresses 00 (hexadecimal) to 7E (hexadecimal). Examples of these 128 registers shown in FIG. 5 are: register 552 at address 00 (hexadecimal), register 554 at address 02 (hexadecimal), register 556 at address 04 (hexadecimal), register 558 at address 06 (hexadecimal), register 560 at address 08 (hexadecimal), register 562 at address 0A (hexadecimal), register 564 at address 76 (hexadecimal), register 566 at address 78 (hexadecimal), register 568 at address 7A (hexadecimal), register 570 at address 7C (hexadecimal), and register 572 at address 7E (hexadecimal).

Referring to FIG. 6, a "register map" 606 (corresponding to codec register set 306 in FIG. 3) shows the usage of the registers in the codec register set according to the AC '97 specification. Column 608 shows the hexadecimal address of each register in register map 606. Column 610 shows the name of each register corresponding to its respective hexadecimal address. Column 612 shows the function of bit 15 in the particular register. If bit 15 in a particular register has no specified function, an "X" is used. Similarly, columns 614, 616, 618, 620, 622, 624, 626, 628, 630, 632, 634, 636, 638, 640, and 642 show, respectively, the functions of bits 14 through 0 of each register in register map 606.

Referring to row 646 as an example, a register called "CD Volume" having a hexadecimal address 12 is shown. Column 612 shows that bit 15 of the CD Volume register corresponds to setting or resetting the "mute" function. Each bit (or group of bits) other than those designated as "X" has a specific function in each register of register map 606. If any of the bits 14 through 0 of a certain register does not have a specified function, an "X" is used to indicate so. The functions of the various bits (or groups of bits) are not discussed in the present application. The functions of the various bits (or groups of bits) in the register map shown in FIG. 6 are discussed in detail in the AC '97 specification which specification has been fully incorporated into the present application by reference.

Still referring to FIG. 6, column 644 shows the default value of each register in register map 606. In other words, when a specific value has not been written into a particular register, the value of each bit in the register is set according to the default value shown in column 644. As stated above, only the even-numbered registers have an assigned function and only those registers (i.e. the even-numbered registers) can be accessed according to the AC '97 specification. That is the reason that only even-numbered registers are shown in register map 606. Out of the even-numbered registers shown in register map 606, only those registers within hexadecimal addresses between 5A and 7A can be used by a design engineer.

Registers with addresses between 5A (hexadecimal) and 7A (hexadecimal) are pointed to by numeral 650 in FIG. 6. These registers are generally referred to as "Vendor Reserved" in register map 606, indicating that these registers can be arbitrarily used by various design engineers and vendors. However, there are only 16 even-numbered registers located between addresses 5A (hexadecimal) and 7A (hexadecimal), and only those 16 registers can be used, in an arbitrary fashion, by a design engineer. As previously stated, even this small number of registers are in concurrent demand by a large number of competing vendors and design engineers.

Figure 7:
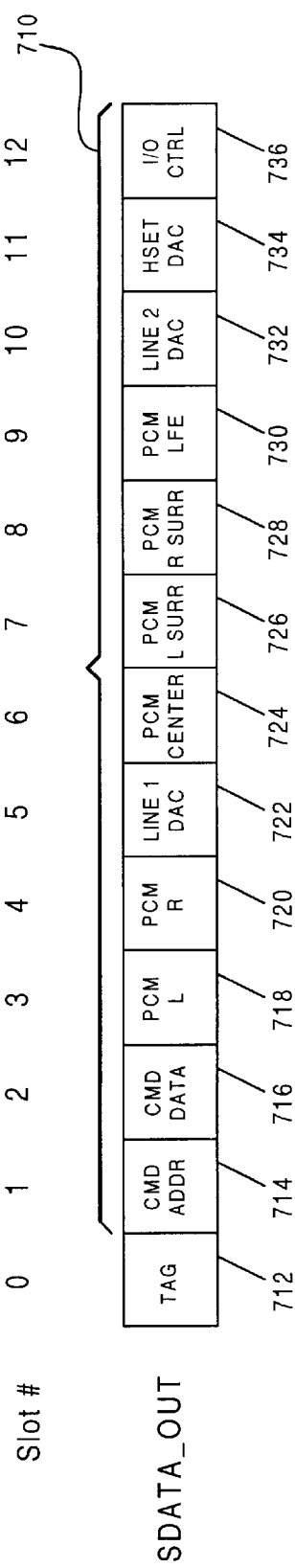
FIG. 7 illustrates the protocol for communication between a controller and a codec according to the AC '97 specification for the SDATA_OUT line.
Figure 9:
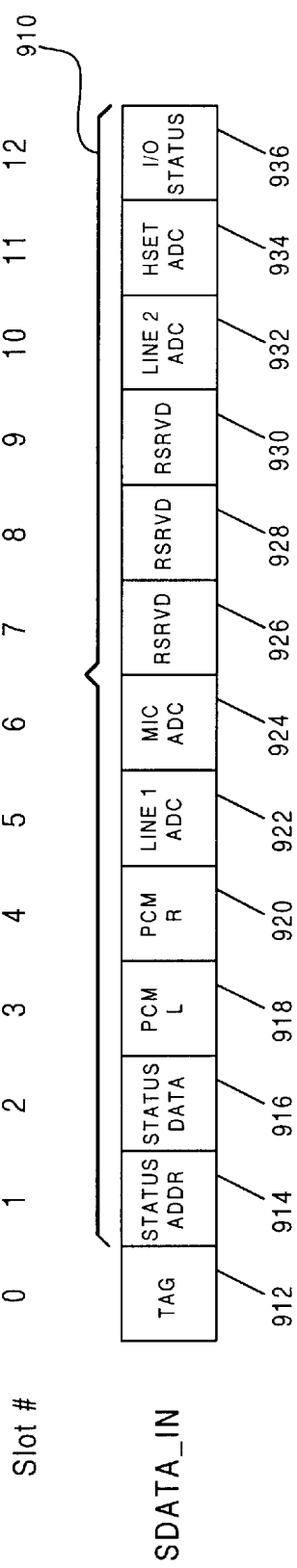
FIG. 9 illustrates the protocol for communication between a controller and a codec according to the AC '97 specification for the SDATA_IN line.

During the operation of codec 410 (FIG. 4), address and control data are transmitted from controller 402 to codec 410 only through a single line, namely SDATA_OUT 435. Moreover, transmission of address and control data through the SDATA_OUT line 435 follows a restrictive protocol. This protocol is shown in FIG. 7. Likewise, address and control data are transmitted from codec 410 to controller 402 only through a single line, namely SDATA_IN 437. The transmission of address and control data through the SDATA_IN line 437 also follows a restrictive protocol that is shown in FIG. 9.

Transmission of data from controller 402 to codec 410 through SDATA_OUT 435 is performed in 12 outgoing "slots" following an initial "TAG" slot. According to the AC '97 specification, each "slot" contains up to twenty bits of information used for communication between the codec and the controller. The 12 slots following the TAG slot comprise a "frame."

FIG. 7 shows frame 710 comprising slots 1 through 12. Prior to initiation of each frame 710, a "TAG" flags the validity of the entire frame. Slot 0 in FIG. 7, which precedes frame 710, corresponds to TAG 712. Slot 1 is the first slot in frame 710. Slot 1 corresponds to CMD ADDR 714 in FIG. 7. The second slot in frame 710 corresponds to CMD DATA 716.

CMD ADDR 714 and CMD DATA 716 are described further below. However, prior to further discussion of CMD ADDR 714 and CMD DATA 716, the remaining slots in frame 710 are briefly discussed here. Slot 3 corresponds to PCM L 718 which is used for digital audio left playback and comprises standard PCM output samples. Slot 4 corresponds to PCM R 720 which is used for digital audio right playback and comprises standard PCM output samples. Slot 5 corresponds to LINE 1 DAC 722 which is for modem DAC input data. Slots 6, 7, 8 and 9 correspond to PCM CENTER 724, PCM L SURR 726, PCM R SURR 728, and PCM LFE 730, respectively. PCM CENTER 724, PCM L SURR 726, PCM R SURR 728, and PCM LFE 730 are used for an optional 6-channel PCM playback mode. Slots 10 and 11 correspond to LINE 2 DAC 732 and HSET DAC 734, respectively. LINE 2 DAC 732 and HSET DAC 734 are used, respectively, for an optional modem line 2 and a handset output. Slot 12 corresponds to I/O CTRL 736 which is used for an optional modem GPIO control.

Figure 8:
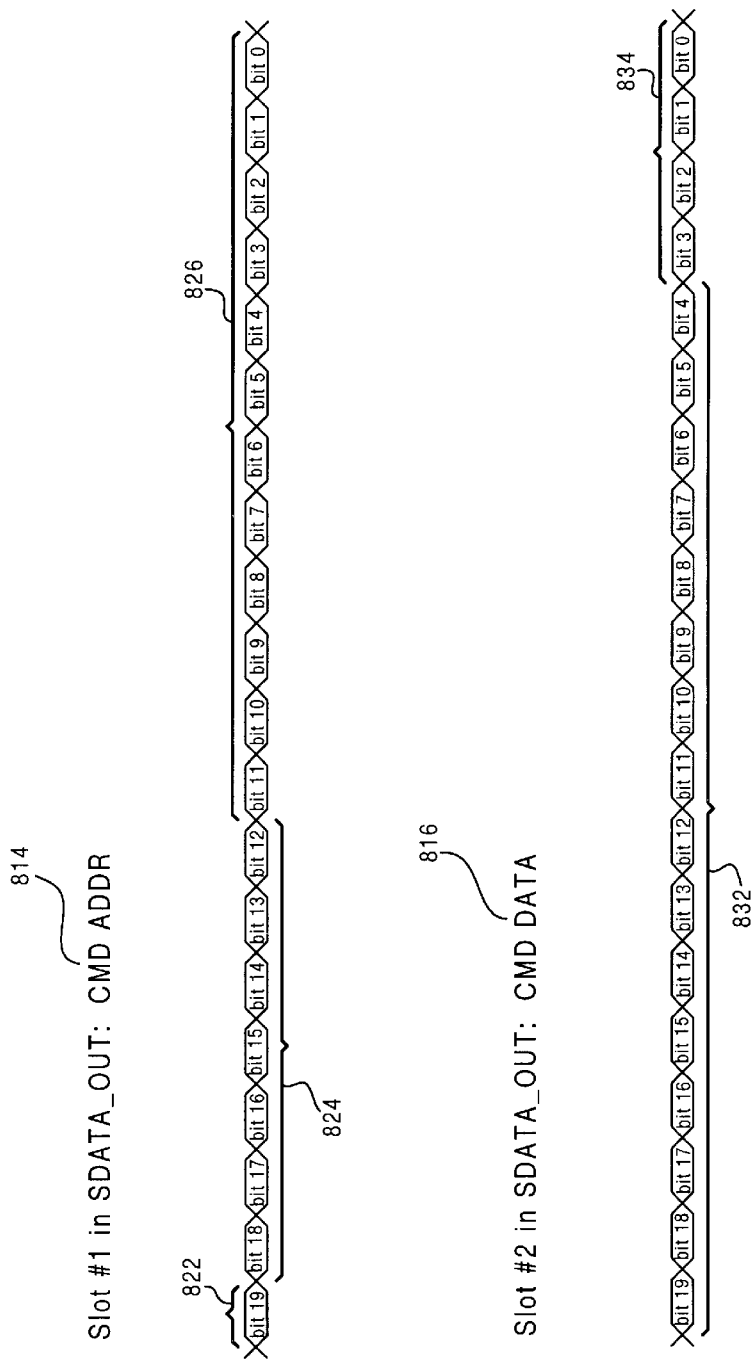
FIG. 8 is an expanded view of the CMD ADDR and CMD DATA slots which are two of the thirteen slots within the AC '97 communication protocol shown in FIG. 7.

As stated above, slots 1 and 2 in frame 710 correspond to CMD ADDR 714 and CMD DATA 716 slots, respectively. FIG. 8 shows an expanded view of the CMD ADDR 714 and CMD DATA 716 slots. CMD ADDR 814 in FIG. 8 corresponds to CMD ADDR 714 in FIG. 7 and is shown as including 20 bits of data. Bit 19 in the CMD ADDR 714 slot, referred to by numeral 822, is a Read/Write control bit. This bit indicates whether controller 402 (FIG. 4) is addressing a particular register in codec register set 406 (FIG. 4) for the purpose of a read or write operation. The following seven bits, i.e. bits 18 through 12, are referred to by numeral 824. Bits 18 through 12 hold the address of the particular register in codec register set 406 (FIG. 4) which is being targeted by controller 402 (FIG. 4) for a read or write operation. The particular register being targeted by the controller for a read or write operation is referred to as the "target register" in this application.

These seven bits, i.e. bits 18 through 12, can address the 128 registers in codec register set 406. However, the odd-numbered registers are reserved and are not to be accessed by the design engineer. Accordingly, only the 64 even-numbered registers in codec 406 can be accessed for the purpose of a read or write operation by an address indicated by bits 18 through 12 in CMD ADDR 814 slot. Moreover, as explained above, only 16 of these 64 registers are available for a design engineer or a vendor. The remaining 12 bits, i.e. bits 11 through 0, in the CMD ADDR slot are referred to by numeral 826. These 12 bits, i.e. bits 11 through 0, are reserved and must be "stuffed" with 0's by controller 402.

Continuing with FIG. 8, CMD DATA 816 in FIG. 8 corresponds to CMD DATA 716 in FIG. 7 and is shown as including 20 bits of data. Bits 19 through 4 are referred to by numeral 832. Bits 19 through 4 deliver a 16-bit data to the particular register in codec register set 406 (FIG. 4) which is being addressed by controller 402 (FIG. 4) for a write operation. If the controller was addressing the particular register in codec register set for a read operation, bits 19 through 4 would be stuffed with 0's and, of course, these bits would not be written into any of the registers. The trailing four bits, i.e. bits 3 through 0, are referred to by numeral 834. These four bits, i.e. bits 3 through 0, are reserved and are always stuffed with 0's.

Transmission of data from codec 410 to controller 402 through SDATA_IN 437 is also performed in 12 incoming "slots" following an initial "TAG" slot. As stated above, according to the AC '97 specification, each "slot" contains up to twenty bits of information used for communication between the codec and the controller. The 12 slots following the TAG slot comprise a "frame."

FIG. 9 shows frame 910 comprising slots 1 through 12. Prior to initiation of each frame 910, a "TAG" flags the validity of the entire frame. Slot 0 in FIG. 9, which precedes frame 910, corresponds to TAG 912. Slot 1 is the first slot in frame 910. Slot 1 corresponds to STATUS ADDR 914 in FIG. 9. The second slot in frame 910 corresponds to STATUS DATA 916.

STATUS ADDR 914 and STATUS DATA 916 are described further below. However, prior to further discussion of STATUS ADDR 914 and STATUS DATA 916, the remaining slots in frame 910 are briefly discussed here. Slot 3 corresponds to PCM L 918 which is used for digital audio left channel record and comprises standard PCM input samples. Slot 4 corresponds to PCM R 920 which is used for digital audio right channel record and comprises standard PCM input samples. Slot 5 corresponds to LINE 1 ADC 922 which is for modem ADC output data. Slot 6 corresponds to MIC ADC 924 which is for microphone ADC record data. Slots 7, 8 and 9 correspond to RSRVD 926, RSRVD 928, and RSRVD 930, respectively. Slots 7 through 9 are reserved for future use and are always stuffed with 0's according to the AC '97 specification. Slots 10 and 11 correspond to LINE 2 ADC 932 and HSET ADC 934, respectively. LINE 2 ADC 932 and HSET ADC 934 are used, respectively, for an optional modem line 2 and a handset input. Slot 12 corresponds to I/O STATUS 936 which is used for an optional modem GPIO status.

Figure 10:
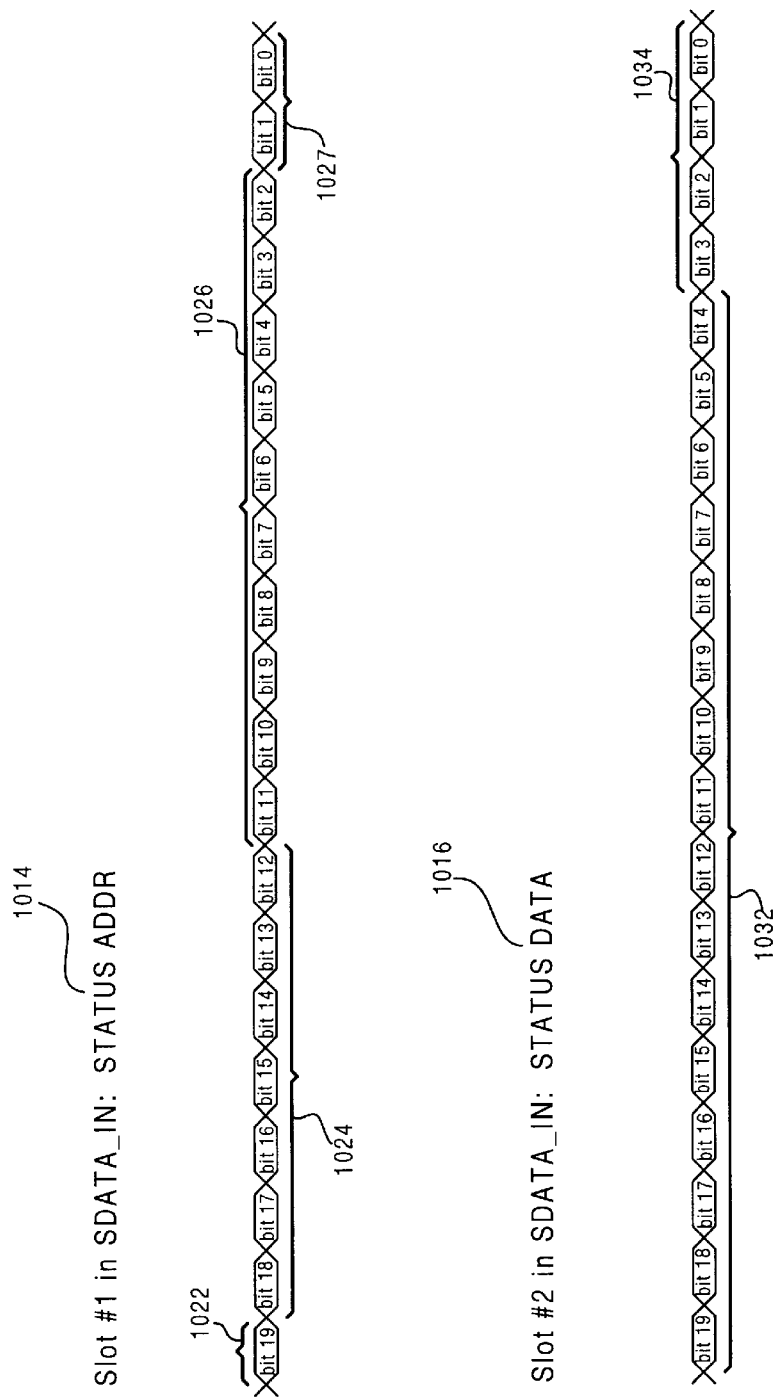
FIG. 10 is an expanded view of the STATUS ADDR and STATUS DATA slots which are two of the thirteen slots within the AC '97 communication protocol shown in FIG. 9.

As stated above, slots 1 and 2 in frame 910 correspond to STATUS ADDR 914 and STATUS DATA 916, respectively. FIG. 10 shows an expanded view of the STATUS ADDR 914 and STATUS DATA 916 slots. STATUS ADDR 1014 in FIG. 10 corresponds to STATUS ADDR 914 in FIG. 9 and is shown as including 20 bits of data. Bit 19 in the STATUS ADDR slot, referred to by numeral 1022, is a reserved bit which is stuffed with "0" according to AC '97 specification. The following seven bits, i.e. bits 18 through 12, are referred to by numeral 1024. Bits 18 through 12 hold the address of the particular register in codec register set 406 (FIG. 4) from which data is being returned during slot 2 (i.e. during STATUS DATA slot 916). In other words, bits 18 through 12 hold the address of the target register from which data is being returned to the controller on the SDATA_IN 437 line during slot 2. These seven bits, i.e. bits 18 through 12, can hold the addresses of all the 128 registers in codec register set 406. However, as stated above, the odd-numbered registers are reserved and are not to be accessed by the design engineer. Accordingly, only the 64 even-numbered registers in codec 406 can be accessed for the purpose of a read or write operation by an address indicated by bits 18 through 12. Moreover, as explained above, only 16 of these 64 registers are available for arbitrary use by a design engineer or a vendor.

The following ten bits, i.e. bits 11 through 2, in the STATUS ADDR slot are referred to by numeral 1026. These 10 bits, i.e. bits 11 through 2, are used as data request flags to obtain data from, respectively, slots 3 through 12, in the next output frame from the codec. The remaining two bits in STATUS ADDR slot 1014 are reserved and set to "0" according to the AC '97 specification.

Continuing with FIG. 10, STATUS DATA 1016 corresponds to STATUS DATA 916 in FIG. 9 and is shown as including 20 bits of data. Bits 19 through 4 are referred to by numeral 1032. Bits 19 through 4 deliver a 16-bit data from the particular register in codec register set 406 (FIG. 4) which is being addressed by controller 402 (FIG. 4) for a read operation. The trailing four bits, i.e. bits 3 through 0, are referred to by numeral 1034. These four bits, i.e. bits 3 through 0, are reserved and are always stuffed with 0's. Referring to FIG. 4, it is desired to use controller 402 to address and control the great number of registers in expansion devices, such as SSD registers 407, LSD registers 415, and E-PHY registers 411 by transmitting data through SDATA_OUT 435 while complying with the communication protocol explained in relation to FIG. 7 and 8. It is appreciated that due to the very limited number of registers in codec register set 406, namely only 16 registers, available to various design engineers and vendors, it is not possible to implement a one to one mapping of the registers in the expansion devices into the codec register set 406.

By way of overview of the operation of the present invention, the invention enables controller 402 to address and control a great number of registers such as SSD registers 407, E-PHY registers 411, and LSD registers 415 located respectively in expansion devices SSD 408, E-PHY 412, and LSD 416. The invention enables controller 402 to address and control the large number of registers in these expansion devices despite the limitations imposed by the small number of available registers in codec register set 406, and despite the limitations imposed by a single line available for transmission of address and control data, namely SDATA_OUT 435, and further despite the limitations due to a restrictive protocol for addressing and controlling expansion devices such as SSD 408, E-PHY 412, and LSD 416.

According to one embodiment of the present invention, a single register in codec register set 406 (FIG. 4) is set aside for the purpose of addressing and controlling all other registers in various expansion devices and modules which are to be addressed and controlled through AC-link 404 (FIG. 4). The register set aside for the purpose of addressing and controlling all other registers in various expansion devices is also referred to as the "designated register." Of course, the designated register must be one of the 16 registers available to the design engineer, namely one of the 16 registers between addresses 5A (hexadecimal) and 7A (hexadecimal). However, any one of these 16 registers can be used for the purpose of implementing this embodiment of the present invention. In this embodiment of the invention, it has been decided that the register at address 7A (hexadecimal) is set aside to implement the present invention.

Figure 11:
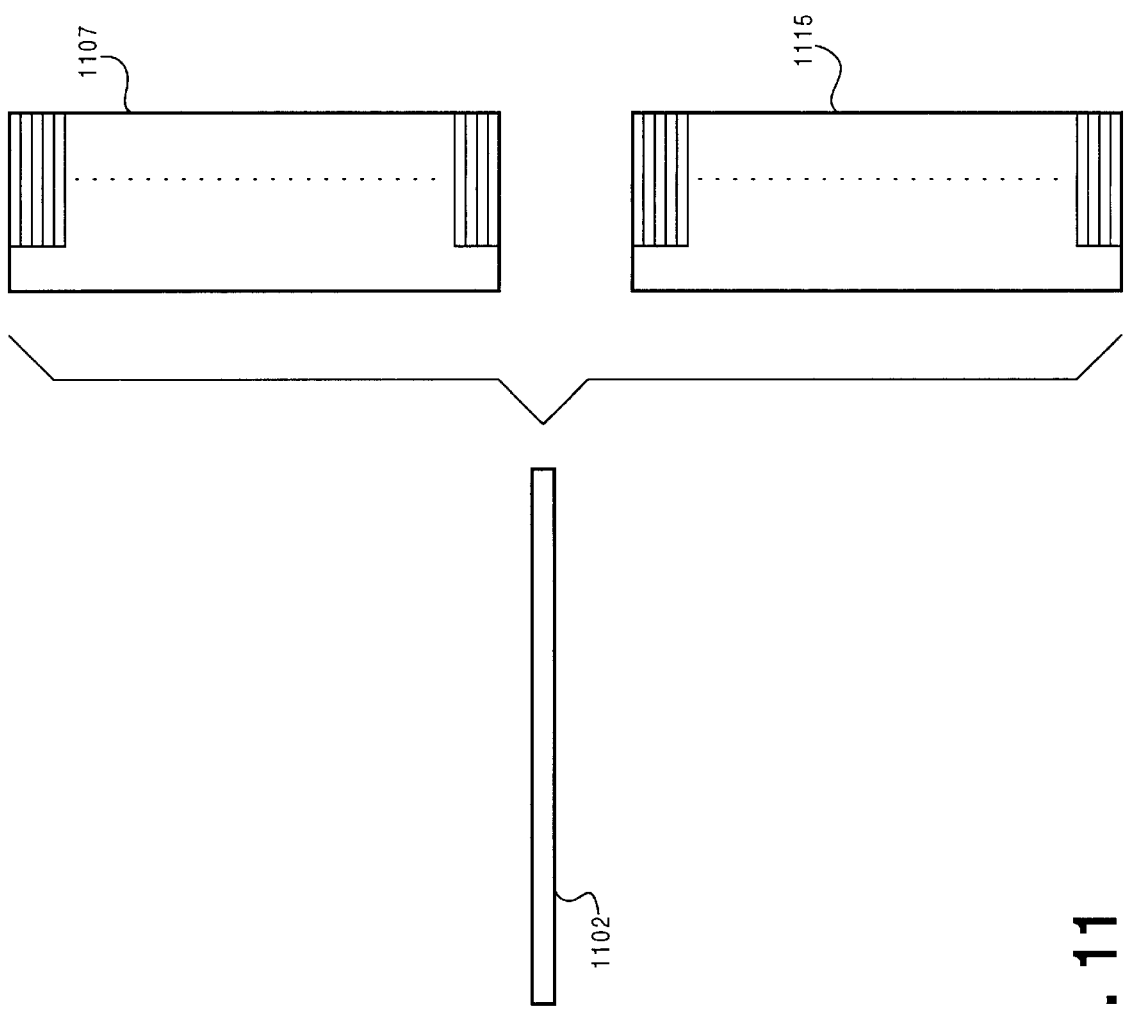
FIG. 11 illustrates the concept of one embodiment of the present invention where a single register in the codec register set is designated and used for enabling a controller to address and control additional register sets through the AC-link.

FIG. 11 illustrates the concept of the present invention for the embodiment of the invention where a single register in the codec register set is designated and used for enabling the controller to address and control additional register sets through the AC-link. Register 1102, which for this embodiment of the invention corresponds to register 7A in the codec register set, is utilized to address a particular register (i.e. a "target register") in register set 1107 or a particular register (i.e. a "target register") in register set 1115. Register set 1107 corresponds to SSD registers 407 while register set 1115 corresponds to LSD registers 415. Register 1102 (corresponding to register 7A) is used to also transfer data to or from the particular register addressed by register 1102.

Thus, in this embodiment of the invention, register 7A is designated and used by the controller for the purpose of writing and reading address and data for another register located in the SSD registers or in the LSD registers. The use of a register in the codec register set, such as register 7A, to address and control expansion devices through an AC-link and through a codec in compliance with the AC '97 specification is unique to the present invention.

Figure 12:
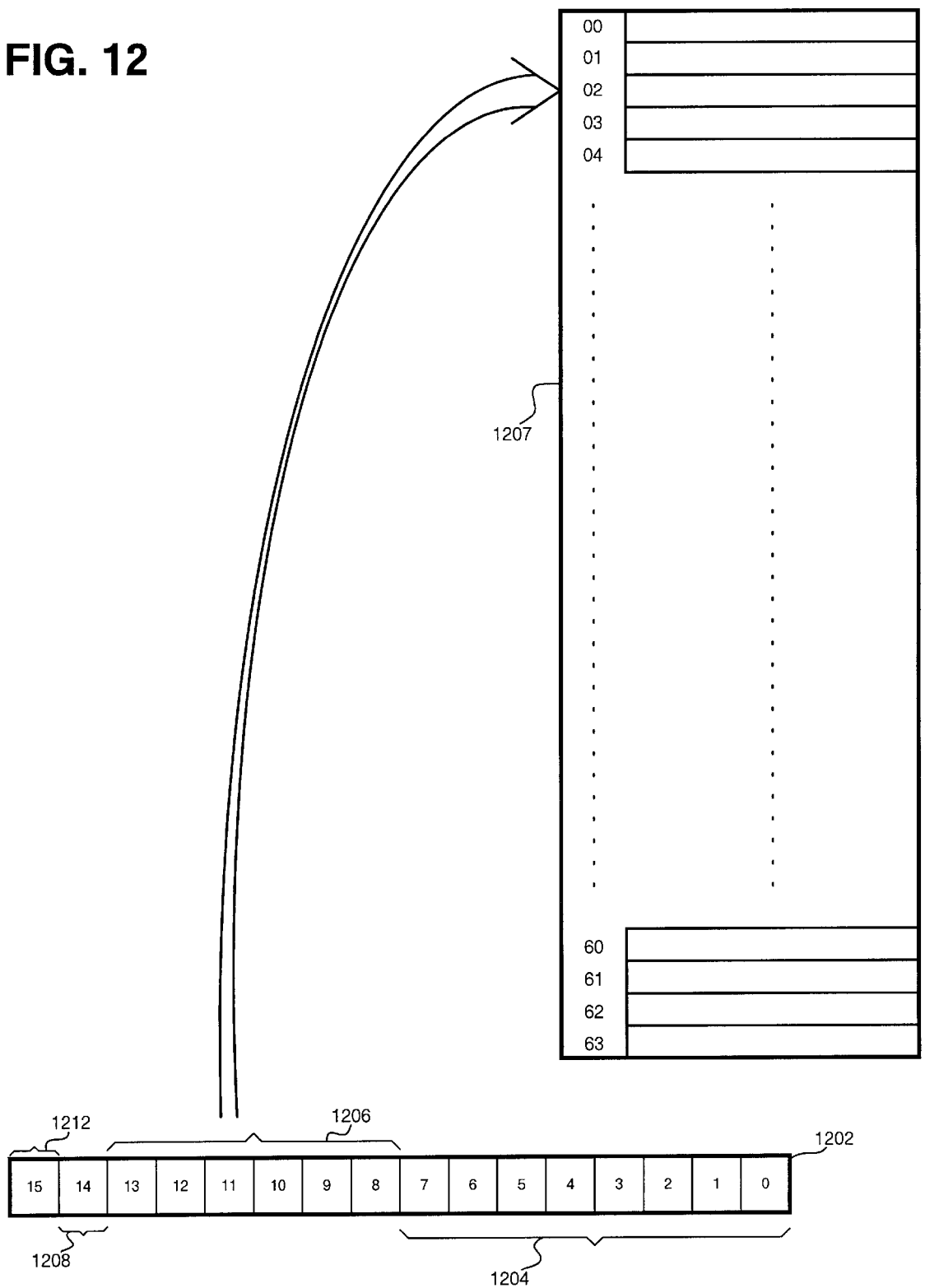
FIG. 12 further illustrates one embodiment of the present invention where a single register in the codec register set is designated and used for enabling a controller to address and control additional register sets through the AC-link.

Referring to FIG. 12, the embodiment of the present invention utilizing a single register from the available 16 registers in the codec register set to address and control expansion devices (such as the SSD and LSD) is described. As stated above, for the purpose of the present application, the single designated register used in this embodiment of the invention is assumed to be register 7A. An expanded view of register 7A is shown as register 1202 in FIG. 12. Bit 15 of register 7A is used to indicate whether the operation to be performed by the controller is a read or write operation. Bit 15 is referred to by numeral 1212 in FIG. 12. In this embodiment of the invention, a read operation is indicated by a "1" and a write operation is indicated by a "0".

Bit 14 of register 7A is referred to by numeral 1208 in FIG. 12. Bit 14 selects between two sets of registers to be addressed and controlled by the controller. In the present embodiment, if bit 14 is a "0" the SSD registers are addressed and if bit 14 is a "1" the LSD registers are addressed. The following six bits, i.e. bits 13 through 8, are referred to by numeral 1206 in FIG. 12. These six bits contain the address of the particular register within the set of registers selected by bit 14. For example, if bit 14 is a "0" and bits 13 through 8 indicate an address of 61, the register at address 61 within the SSD registers is to be addressed by the controller. As stated above, the particular register addressed by bits 13 through 8 of the designated register (i.e., register 7A in this embodiment of the invention) is referred to as the "target register." In the present example, the target register is the SSD register at address 61.

Bits 13 through 8 permit a total of 64 registers to be addressed. Taking into account bit 14 which selects between the SSD and LSD registers, a total of 64 registers in the SSD and a total of 64 registers in the LSD can be addressed by bits 14 through 8. Thus, bits 14 through 8 in register 7A enable controller 402 (FIG. 4) to address a grand total of 128 registers. Register set 1207 in FIG. 12 is shown to comprise registers 0 through 63 (i.e. a total of 64 registers). Register set 1207 can be either SSD registers 407 (FIG. 4) or LSD registers 415 (FIG. 4) depending on whether bit 14 of register 7A is a "0" or a "1".

The remaining eight bits referred to by numeral 1204, i.e. bits 7 through 0, hold the data to be written into or read from the target register. Thus, in this embodiment of the invention, data can be written into or read from registers that are up to 8 bit wide (if it is desired to write data into or read data from registers that are 16 bit wide, two consecutive write or read operations must be performed). If the operation to be performed by the controller is a write operation, the data contained in bits 7 through 0 is written into the particular register addressed by bits 14 through 8. If the operation to be performed by the controller is a read operation, the data read from the particular register addressed by bits 14 through 8 of the target register is loaded into bits 7 through 0 of register 7A.

It is noted that the specific assignment of bits described in this embodiment of the invention, i.e. the specific assignment of bits 7 through 0 to contain data, bits 8 through 14 to contain address, and bit 15 to contain read/write information, is quite arbitrary. These specific bit assignments can obviously be modified without departing from the scope of the present invention as defined by the claims herein.

To set aside register 7A in the codec register set and implement this embodiment of the invention, the codec's state machine is designed for proper interpretation and handling of controller accesses of register 7A. As is known in the art, a state machine is comprised of combinational and sequential logic elements for stepping the system through various operations based on the current state of the system. According to the present invention, the codec's state machine (not shown in any of the Figures) is designed to treat the data directed from the controller to register 7A in the particular way described above in order to implement the present embodiment of the invention. In other words, according to the present embodiment of the invention, when the controller transmits data to register 7A in the codec register set, the data received by register 7A is interpreted by the codec state machine as follows.

The codec state machine would use the data in bits 14 through 8 of register 7A to address a particular register in either the SSD or LSD. The codec state machine would then use the data in bits 7 through 0 of register 7A and write that data into the particular register addressed by bits 14 through 8, if bit 15 of register 7A is a "0". If bit 15 of register 7A is a "1", the data in the particular register addressed by bits 14 through 8 is read out and stored as bits 7 through 0 of register 7A. The controller would then read the data stored in bits 7 through 0 of register 7A which is equivalent to reading the data from the register which was addressed by bits 14 through 8. The effect of these operations is that the controller can access the entire bank of 64 registers in the SSD device as well as the entire bank of 64 registers in the LSD device by using register 7A in the codec register set in the manner described above.

It is noted that according to the embodiment of the invention where a single designated register is used, a second, a third, and in fact any number of registers can be used as additional single designated registers. For example, in addition to register 7A being a designated register, register 7C or some other register can also be a designated register.

According to another embodiment of the present invention, two registers in codec register set 406 (FIG. 4) are set aside (or "designated") for the purpose of addressing and controlling all other registers in expansion devices and modules which are to be addressed and controlled through AC-link 404 (FIG. 4). Of course, the two designated registers must be selected from two of the 16 registers available to the design engineer, namely two of the 16 registers between addresses 5A (hexadecimal) and 7A (hexadecimal). However, any two of these 16 registers can be used for the purpose of implementing this embodiment of the invention. In this embodiment of the invention, it has been decided that the registers at addresses 7A (hexadecimal) and 78 (hexadecimal) are set aside to implement the present invention.

Figure 13:
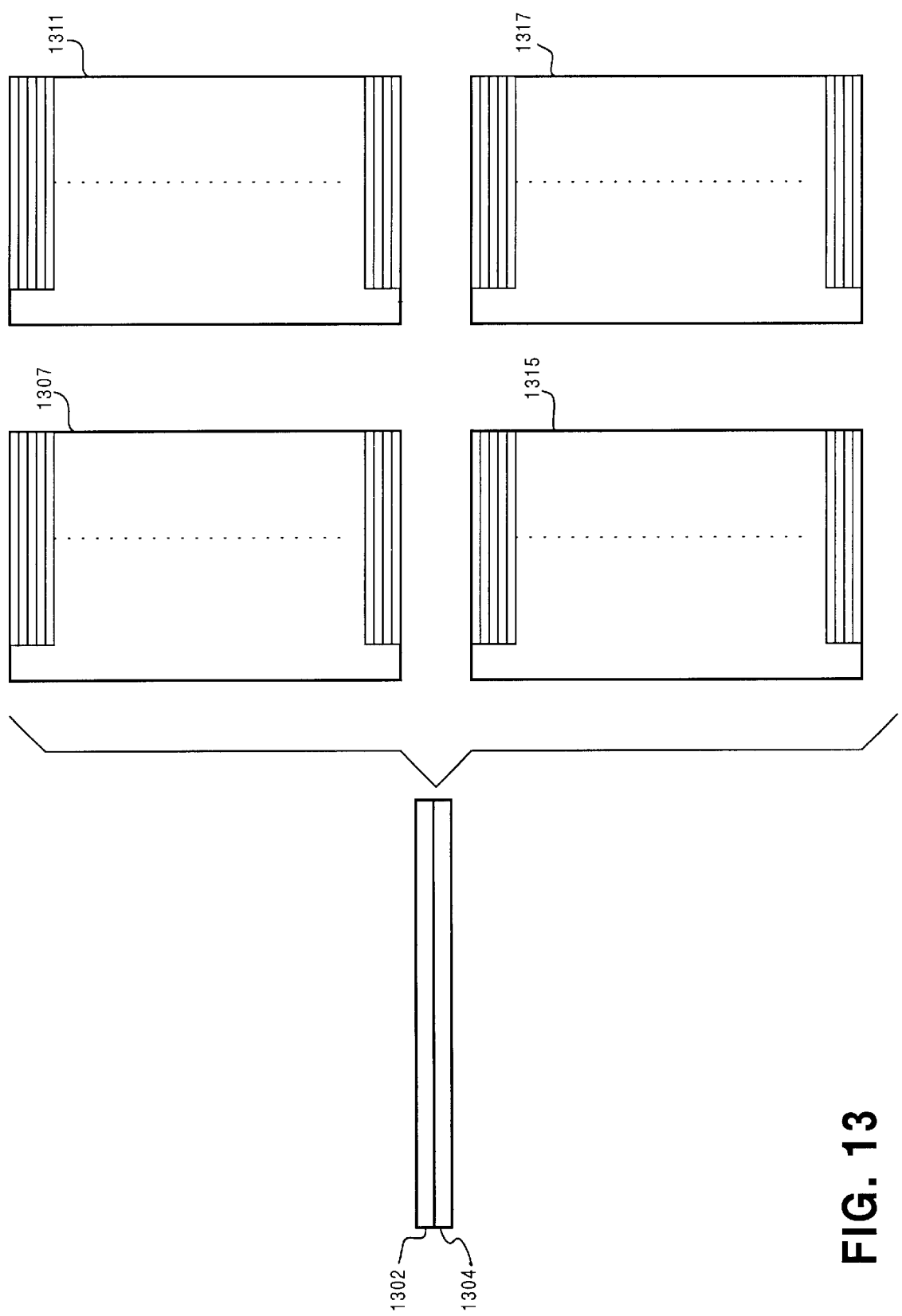
FIG. 13 illustrates the concept of one embodiment of the present invention where two registers in the codec register set are designated and used for enabling a controller to address and control additional register sets through the AC-link.

FIG. 13 illustrates the concept of the present invention for the embodiment of the invention where two registers in the codec register set are designated and used for enabling the controller to address and control additional register sets through the AC-link. In this embodiment of the invention, registers 1302 and 1304 in FIG. 13 correspond, respectively, to registers 78 and 7A in the codec register set. These two registers are utilized to address a particular register in any of the register sets 1307, 1311, 1315, or 1317. Register set 1307 corresponds to SSD registers 407 while register set 1311 corresponds to E-PHY registers 411 and register set 1315 corresponds to LSD registers 415. Register set 1317 is an additional register set which may belong to another expansion device, in addition to the LSD, SSD, and E-PHY expansion devices, which can be utilized in this embodiment of the invention. In this embodiment of the invention, register 1304 (corresponding to register 7A) is used to transfer 16 bits of data to or from the particular register addressed by register 1302 (corresponding to register 78). Thus, in this embodiment of the invention, register 7A is designated and used by the controller for the purpose of writing data to and reading data from the target register located in any of the expansion devices SSD, LSD, E-PHY, as well as a fourth expansion device which may be used. The use of two registers in the codec register set, such as registers 7A and 78, to address and control expansion devices through an AC-link and through a codec in compliance with the AC '97 specification is unique to the present invention.

Figure 14:
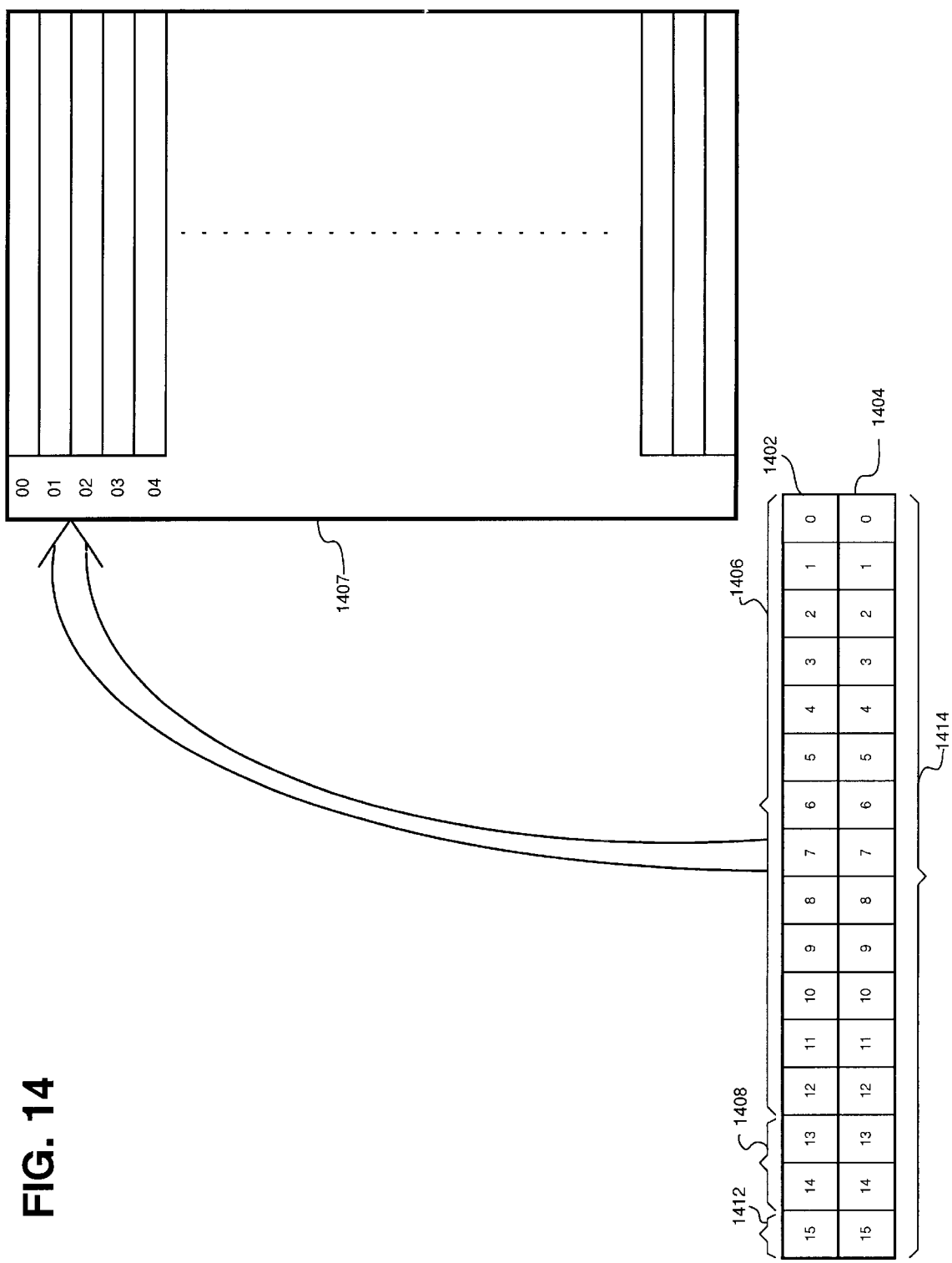
FIG. 14 further illustrates one embodiment of the present invention where two registers in the codec register set are designated and used for enabling a controller to address and control additional register sets through the AC-link.

Referring to FIG. 14, the embodiment of the present invention utilizing two registers from the available 16 registers in the codec register set for addressing and controlling four other sets of registers (such as the SSD registers, E-PHY registers, LSD registers, and a fourth set of registers) is described. As stated above, for the purpose of the present application, the two registers used in this embodiment of the invention are assumed to be registers 78 and 7A. An expanded view of registers 78 and 7A are shown, respectively, as registers 1402 and 1404 in FIG. 14. Bit 15 of register 78 (shown as register 1402 in FIG. 14) is used to indicate whether the operation to be performed by the controller is a read or write operation. Bit 15 of register 78 is referred to by numeral 1412 in FIG. 14. In this embodiment of the invention, a read operation is indicated by a "1" and a write operation is indicated by a "0".

Bits 14 and 13 of register 78 are referred to by numeral 1408 in FIG. 14. Bits 14 and 13 of register 78 select between four sets of registers to be addressed and controlled by the controller. For example, if bits 14 and 13 are both "0", the SSD registers are selected; if bit 13 is "1" and bit 14 is "0", the E-PHY registers are selected; if bit 13 is a "0" and bit 14 is a "1", the LSD registers are selected; and if both bits 14 and 13 are "1", an additional fourth register set is selected.

The trailing 13 bits, i.e. bits 12 through 0, are referred to by numeral 1406 in FIG. 14. These 13 bits hold the address of the particular register within the set of registers selected by bits 14 and 13. For example, if bits 14 and 13 are both "0" and bits 12 through 0 indicate an address of 61, the register at address 61 within the SSD registers is to be addressed by the controller.

Bits 12 through 0 permit the addressing of a total of 8,192 (i.e. $2^{13}$) registers. Taking into account bits 14 and 13 which select between the SSD, E-PHY, LSD, and an additional set of registers, a total of 8,192 registers in the SSD, a total of 8,192 registers in the E-PHY, a total of 8,192 registers in LSD, and a total of 8,192 registers in an additional fourth register set can be addressed by bits 14 through 0. Thus, bits 14 through 0 in register 78 enable controller 402 (FIG. 4) to address a grand total of 32,768 registers. Register set 1407 in FIG. 14 can be any of the SSD registers 407 (FIG. 4), E-PHY registers 411 (FIG. 4), LSD registers 415 (FIG. 4), or a fourth register set (not shown in any of the Figures) depending on the value of bits 14 and 13 of register 78. The particular register addressed by bits 14 through 0 of register 78 is referred to as the "target register" in this application. In the example given above, the target register is the SSD register at address 61.

In this embodiment of the invention, bits 15 through 0 of register 7A hold the data to be written into or read from the particular register selected. Bits 15 through 0 of register 7A are referred to by numeral 1414 in FIG. 14. Since register 7A is 16 bit wide, data can be written into or read from registers that are up to 16 bit wide. If the operation to be performed by the controller is a write operation, the data contained in bits 15 through 0 of register 7A is written into the particular register addressed by bits 14 through 0 of register 78. If the operation to be performed by the controller is a read operation, the data read from the particular register addressed by bits 14 through 0 of register 78 is written into bits 15 through 0 of register 7A.

It is noted that the specific assignment of bits described in this embodiment of the invention, i.e. the specific assignment of bits 15 through 0 of register 7A to contain data, and bits 14 through 0 of register 78 to contain address, and bit 15 of register 78 to contain read/write information, is quite arbitrary. These specific bit assignments can obviously be varied without departing from the scope of the present invention as defined by the claims herein.

To set aside registers 78 and 7A as designated registers in the codec register set and implement this embodiment of the invention, the codec's state machine is designed for proper interpretation and handling of controller accesses of registers 78 and 7A. According to the present invention, the codec's state machine (not shown in any of the Figures) is designed to treat the data directed from the controller to registers 78 and 7A in the particular way described above in order to implement the present embodiment of the invention. In other words, according to the present embodiment of the invention, when the controller transmits data to registers 78 and 7A in the codec register set, the data received by these registers is interpreted by the codec state machine as follows.

The codec state machine would use the data in bits 14 through 0 of register 78 to address a particular register in the SSD, E-PHY, LSD, or an additional fourth register set. The codec state machine would then use the data in bits 15 through 0 of register 7A and write that data into the particular register addressed by bits 14 through 0 of register 78 if bit 15 of register 78 is a "0". If bit 15 of register 78 is a "1", the data in the particular register addressed by bits 14 through 0 of register 78 is read out and stored as bits 15 through 0 of register 7A. The controller would then read the data stored in bits 15 through 0 of register 7A which is equivalent to reading the data from the register which was addressed by bits 14 through 0 of register 78. The effect of these operations is that the controller can access the entire bank of registers in the SSD device as well as the entire bank of registers in the E-PHY and LSD devices (and also the entire bank of an additional fourth expansion device) by using registers 78 and 7A in the codec register set in the manner described above.

It is noted that according to the embodiment of the invention where a pair of designated registers are used (such as registers 7A and 78 as discussed above), a second, a third, and in fact any number of additional pairs of designated registers can be used. For example, in addition to the designated register pair consisting of registers 7A and 78, another designated register pair consisting of registers 7B and 7C can be used.

Throughout the present application, the terms "expansion device" and "expansion module" have been used. It is understood that an "expansion device" or an "expansion module" may refer to devices or modules that are in fact integrated in the codec. In other words, an expansion device or an expansion module refers to those devices or modules that are integrated in the codec as well as to those devices or modules that are not integrated in the codec.

It is appreciated that accessing and controlling expansion devices and modules through the AC-link and a codec complying with the AC '97 specification were not contemplated nor achievable in the prior art. In the manner explained in this application, the present invention has addressed and overcome the serious need in the art for accessing and controlling expansion devices and modules through the AC-link and a codec while complying with the AC '97 specification. More specifically, the invention has overcome the prior art's inability to address and control expansion devices and modules through the AC-link despite the limitations imposed by the AC-link, a restrictive protocol, and the small number of available registers in the codec register set.

Thus, a method and apparatus for addressing and controlling expansion devices through an AC-link and a codec has been described.

What is claimed is:

1. An apparatus comprising:
    a controller;
    a codec including a codec register set;
    said codec register set having at least one designated register for addressing and controlling at least one plurality of expansion registers;
    an AC-link connecting said controller to said codec;
    said controller addressing and controlling said at least one plurality of expansion registers through said AC-link and said at least one designated register.

2. The apparatus of claim 1 wherein said at least one plurality of expansion registers is a plurality of System Side Device SSD registers.

3. The apparatus of claim 1 wherein said at least one plurality of expansion registers is a plurality of Line Side Device LSD registers.

4. The apparatus of claim 1 wherein said at least one plurality of expansion registers is a plurality of E-PHY registers.

5. The apparatus of claim 1 wherein said codec complies with AC '97 specification.

6. The apparatus of claim 1 wherein said AC-link complies with with AC '97 specification.

7. The apparatus of claim 1 wherein said AC-link comprises a wire for transmitting a plurality of address and control data bits from said controller to said codec in accordance with AC '97 communication protocol.

8. The apparatus of claim 1 wherein said AC-link comprises a wire for transmitting a plurality of address and control data bits from said codec to said controller in accordance with AC '97 communication protocol.

9. An apparatus comprising:
    a controller coupled to a codec through an AC-link;
    said codec including a codec register set, said codec being coupled to a plurality of System Side Device SSD registers and a plurality of Line Side Device LSD registers;
    said codec register set having a designated register for addressing and controlling said plurality of SSD registers and said plurality of LSD registers;
    said controller writing control data to and reading control data from said plurality of SSD registers and said plurality of LSD registers through said AC-link and said designated register.

10. The apparatus of claim 9 wherein said codec complies with AC '97 specification.

11. The apparatus of claim 9 wherein said AC-link complies with AC '97 specification.

12. The apparatus of claim 9 wherein said AC-link comprises a wire for transmitting a plurality of address and control data bits from said controller to said codec in accordance with AC '97 communication protocol.

13. The apparatus of claim 9 wherein said AC-link comprises a wire for transmitting a plurality of address and control data bits from said codec to said controller in accordance with AC '97 communication protocol.

14. A method comprising the steps of:
    designating a codec register in a codec for addressing and controlling a plurality of registers in at least one expansion device;
    transmitting a plurality of control data bits to said codec register through an AC-link;
    transferring said plurality of control data bits from said codec register to a target register in said plurality of registers.

15. The method of claim 14 wherein said transmitting step is performed by a controller coupled to said codec through said AC-link.

16. The method of claim 14 wherein said AC-link complies with AC '97 specification.

17. The method of claim 14 wherein said codec complies with AC '97 specification.

18. The method of claim 14 wherein said at least one expansion device is an System Side Device SSD device.

19. The method of claim 14 wherein said at least one expansion device is an Line Side Device LSD device.

20. The method of claim 14 wherein said at least one expansion device is an ethernet physical layer interface E-PHY device.

21. The method of claim 14 further comprising the step of transmitting a plurality of address bits to said codec register through an AC-link, said address bits identifying said target register.

22. The method of claim 14 wherein said step of transmitting said plurality of control data bits is performed in compliance with AC '97 communication protocol.

23. The method of claim 21 wherein said step of transmitting said plurality of address bits is performed in compliance with AC '97 communication protocol.

24. A method comprising the steps of:
designating a codec register in a codec for addressing and controlling a plurality of registers in at least one expansion device;
transferring a plurality of control data bits from a target register in said plurality of registers to said codec register;
receiving said plurality of control data bits from said codec register through an AC-link.

25. The method of claim 24 wherein said receiving step is performed by a controller coupled to said codec through said AC-link.

26. The method of claim 24 wherein said AC-link complies with AC '97 specification.

27. The method of claim 24 wherein said codec complies with AC '97 specification.

28. The method of claim 24 wherein said at least one expansion device is an System Side Device SSD device.

29. The method of claim 24 wherein said at least one expansion device is an Line Side Device LSD device.

30. The method of claim 24 wherein said at least one expansion device is an ethernet physical layer interface E-PHY device.

31. The method of claim 24 further comprising the step of receiving a plurality of address bits from said codec register through an AC-link, said address bits identifying said target register.

32. The method of claim 24 wherein said step of receiving said plurality of control data bits is performed in compliance with AC '97 communication protocol.

33. The method of claim 31 wherein said step of receiving said plurality of address bits is performed in compliance with AC '97 communication protocol.

34. A method comprising the steps of:
designating first and second codec registers in a codec for addressing and controlling a plurality of registers in at least one expansion device;
transmitting a plurality of control data bits to said first codec register through an AC-link;
transmitting a plurality of address bits to said second codec register through said AC-link;
transferring said plurality of control data bits from said first codec register to a target register in said plurality of registers, said target register being identified by said address bits in said second codec register.

35. The method of claim 34 wherein said step of transmitting said plurality of control data bits is performed by a controller coupled to said codec through said AC-link.

36. The method of claim 34 wherein said step of transmitting said plurality of address bits is performed by a controller coupled to said codec through said AC-link.

37. The method of claim 34 wherein said AC-link complies with AC '97 specification.

38. The method of claim 34 wherein said codec complies with AC '97 specification.

39. The method of claim 34 wherein said at least one expansion device is an System Side Device SSD device.

40. The method of claim 34 wherein said at least one expansion device is an Line Side Device LSD device.

41. The method of claim 34 wherein said at least one expansion device is an ethernet physical layer interface E-PHY device.

42. The method of claim 34 wherein said step of transmitting said plurality of control data bits is performed in compliance with AC '97 communication protocol.

43. The method of claim 34 wherein said step of transmitting said plurality of address bits is performed in compliance with AC '97 communication protocol.

44. An apparatus comprising:
a codec including a codec register set, said codec being coupled to an AC-link;
said codec register set having first and second designated registers for addressing and controlling at least one plurality of expansion registers;
said first designated register receiving a plurality of control data bits through said AC-link;
said second designated register receiving a plurality of address bits through said AC-link;
said codec transferring said plurality of control data bits from said first designated register into a target register in said at least one plurality of expansion registers, said target register being identified by said plurality of address bits in said second designated register.

45. The apparatus of claim 44 wherein said at least one plurality of expansion registers is a plurality of System Side Device SSD registers.

46. The apparatus of claim 44 wherein said at least one plurality of expansion registers is a plurality of Line Side Device LSD registers.

47. The apparatus of claim 44 wherein said at least one plurality of expansion registers is a plurality of ethernet physical layer interface E-PHY registers.

48. The apparatus of claim 44 wherein said codec complies with AC '97 specification.

49. The apparatus of claim 44 wherein said AC-link complies with AC '97 specification.

50. The apparatus of claim 44 wherein said AC-link comprises a wire for transmitting said plurality of address bits in accordance with AC '97 communication protocol.

51. The apparatus of claim 44 wherein said AC-link comprises a wire for transmitting said plurality of control data bits in accordance with AC '97 communication protocol.

* * * * *